US008453798B2

(12) United States Patent
Fischer et al.

(10) Patent No.: US 8,453,798 B2
(45) Date of Patent: Jun. 4, 2013

(54) TILTING MECHANISM FOR A LIFTING STRUCTURE OF AN INDUSTRIAL TRUCK, AND METHOD FOR TRANSPORTING AN INDUSTRIAL TRUCK

(75) Inventors: Max Fischer, Rudelzhausen (DE); Alexander Hofbauer, Aidenbach (DE); Carsten Schoettke, Moosburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 816 days.

(21) Appl. No.: 12/325,343

(22) Filed: Dec. 1, 2008

(65) Prior Publication Data

US 2009/0142174 A1 Jun. 4, 2009

(30) Foreign Application Priority Data

Nov. 30, 2007 (DE) ........................ 10 2007 057 678

(51) Int. Cl.
*B60P 1/16* (2006.01)

(52) U.S. Cl.
USPC .......................................................... 187/225

(58) Field of Classification Search
USPC ............ 187/225, 231; 414/425, 634; 280/775
See application file for complete search history.

(56) References Cited

U.S. PATENT DOCUMENTS

| | | | | |
|---|---|---|---|---|
| 1,386,390 | A * | 8/1921 | Barker | 298/21 R |
| 1,587,773 | A | 6/1926 | Greene | |
| 1,719,197 | A * | 7/1929 | Schlothan | 254/3 C |
| 1,753,731 | A | 4/1930 | Abbe | |
| 2,169,440 | A | 8/1939 | Weiss | |
| 3,054,522 | A * | 9/1962 | Peck | 414/635 |
| 3,790,013 | A * | 2/1974 | Smith | 414/636 |
| 4,325,666 | A * | 4/1982 | Chain et al. | 414/24.5 |
| 4,778,327 | A * | 10/1988 | Tufenkian et al. | 414/541 |
| 4,948,326 | A * | 8/1990 | Bedard | 414/541 |
| 5,147,170 | A * | 9/1992 | Detrick | 414/492 |
| 5,380,140 | A * | 1/1995 | Johnson | 414/421 |
| 5,458,451 | A * | 10/1995 | Bratlie et al. | 414/385 |
| 5,575,609 | A * | 11/1996 | Monkhorst et al. | 414/743 |
| 6,217,122 | B1 * | 4/2001 | Kirbie | 298/17.5 |
| 6,273,667 | B2 * | 8/2001 | Karpisek | 414/425 |
| 2004/0076501 | A1 | 4/2004 | McGill et al. | |

FOREIGN PATENT DOCUMENTS

| | | | |
|---|---|---|---|
| DE | 1 896 979 | U | 7/1964 |
| DE | 43 05 639 | C2 | 5/1996 |
| DE | 692 22 755 | T3 | 3/2001 |
| FR | 773939 | | 11/1934 |
| GB | 846 649 | A | 8/1960 |
| GB | 1 470 499 | A | 4/1977 |

* cited by examiner

*Primary Examiner* — William E Dondero
*Assistant Examiner* — Michael Riegelman
(74) *Attorney, Agent, or Firm* — Rothwell, Figg, Ernst & Manbeck, P.C.

(57) ABSTRACT

The invention relates to a tilting mechanism for a lifting structure (14) of an industrial truck (10), the lifting structure (14) being mounted so as to be able to pivot about a hinge pin (D) between an at least approximately vertical operating position and a position, inclined with respect to the vertical, of abutment against the frame (12) of the industrial truck (10), characterized in that the tilting mechanism (22) is linked (36, 38) to the lifting structure (14) and to the frame (12, 54) of the industrial truck (10) and is embodied in such a way that the lifting structure (14) can be fixed in any desired pivoting positions between the operating position and the abutment position. Furthermore, the invention relates to an industrial truck comprising a tilting mechanism of this type and to a method for transporting an industrial truck of this type.

17 Claims, 7 Drawing Sheets

TILTING MECHANISM FOR A LIFTING STRUCTURE OF AN INDUSTRIAL TRUCK, AND METHOD FOR TRANSPORTING AN INDUSTRIAL TRUCK

The invention relates to a tilting mechanism for a lifting structure of an industrial truck, the lifting structure being mounted so as to be able to pivot about a hinge pin between an at least approximately vertical operating position and a position, inclined with respect to the vertical, of abutment against the frame of the industrial truck, the tilting mechanism being linked to the lifting structure and to the frame of the industrial truck and being embodied in such a way that the lifting structure can be fixed in any desired pivoting positions between the operating position and the abutment position.

With regard to the prior art, reference is made for example to DE 43 05 639 C2 and GB 1 470 499 A.

Lifting structures of industrial trucks, in particular of commissioners, have, when the driver's cab or load receiving fork is lowered, a height of more than 2 m to 6 m, depending on the maximum height to which the cab or the load receiving fork can be raised.

In order to allow industrial trucks comprising lifting structures having, when the load part is lowered, a height of greater than approximately 2.9 m to be transported as freight, the lifting structure is pivoted, once the industrial truck has been assembled, about the hinge pin mounted on the frame of the industrial truck, from the approximately vertical operating position into the abutment position, use being made for this purpose, owing to the great weight of the lifting structure, of two cranes from each of which an upper and a lower end of the lifting structure are suspended. This pivoting process is very time-consuming and thus also costly. Furthermore, when the lifting structure is in the abutment position, parts are required on the frame of the industrial truck for securing during transportation; the lifting structure is to be fastened to these parts in the abutment position in order to prevent rocking of the lifting structure in the abutment position during transportation. The pivoting out of the operating position into the abutment position takes place generally at the site of production of the industrial truck, where the on-site equipment includes corresponding crane means. However, once the industrial truck has been delivered to a customer, the lifting structure, which is pivoted into the abutment position, has to be re-erected into the operating position; in many cases, the customer does not have any cranes on site, leading to an increase in start-up costs for the customer, as generally a forklift truck has also to be ordered or hired from the production company in order to erect the lifting structure.

Alternatively, the lifting structure, together with the driver's cab and load receiving fork, can be completely disassembled and transported separately. However, this is complex, because the electrical and hydraulic connecting lines have additionally to be separated.

The object of the invention is to simplify the pivotability of the lifting structure of an industrial truck, so that time and costs can be saved during preparation for transportation of the industrial truck and during start-up thereof.

In order to achieve this object, it is proposed that the tilting mechanism comprise a threaded rod extending between the two linkages.

A tilting mechanism of this type, which can be attached or is attached directly to the industrial truck, allows pivoting of the lifting structure without the use of load transporting means, such as for example cranes or additional forklift trucks. Furthermore, the tilting mechanism, which is applied to the industrial truck and to the lifting structure, allows any desired pivoting position between the operating position and the abutment position to be adhered to, as the lifting structure can be fixed in any desired pivoting position.

The linkage of the tilting mechanism to the lifting structure is preferably arranged in the operating position above the hinge pin of the lifting structure and the linkage of the tilting mechanism is preferably provided on an upper portion of the frame of the industrial truck. Obviously, it is also conceivable to link the tilting mechanism to the frame structure below the hinge pin and to support it in an articulated manner on the side of the frame at a different suitable location. The arrangement of the tilting mechanism is particularly advantageous if, when the lifting structure is in the operating position, the distance between the hinge pin and the linkage to the lifting structure corresponds substantially to the distance between the hinge pin and the linkage to the frame. In particular, the frame-side linkage should be arranged as far away as possible from the hinge pin. Such an arrangement of the tilting mechanism allows optimum transmission of force from the pivoting mechanism to the lifting structure during pivoting both out of the vertical operating position toward the substantially horizontal abutment position and out of the abutment position or any desired pivoting position back into the operating position. However, in principle, these distances can be selected as desired or differ depending on the selected point of linkage to the lifting apparatus or frame.

As the pivoting of the lifting structure generally has to be carried out very rarely and does not form part of the daily operation of a commissioner, it is proposed that the tilting mechanism be able to be detached when the lifting structure is in the operating position. Thus, no components which are not required for operation are located on the lifting structure and on the industrial truck. This allows the risk of damage to these components to be ruled out. Furthermore, a detachable tilting mechanism also allows said tilting mechanism to be attached to any desired industrial trucks if, in the case of said industrial trucks, the lifting structure is to be pivoted out of the operating position for maintenance purposes. If appropriate, it is also conceivable for a tilting mechanism of this type to be offered as a kit module in order to be able to be used in older, accordingly retrofitted commissioners.

In order to allow the pivoting movement of the lifting structure about the hinge pin and in order to achieve the desired fixing in any desired pivoting position, it is proposed that the linkage to the lifting structure comprise a nut which can rotate relative to the lifting structure about an axis orthogonal to the threaded rod and with which the threaded rod is in threaded engagement. In this case, the nut can be fastened to the lifting structure by means of a screw bolt so as to be able to rotate about this axis. The nut, which is rotatably fastened to the lifting structure, is displaceable along the threaded rod, owing to the rotation of said threaded rod, so that the lifting structure can be pivoted out of the operating position toward the abutment position or vice versa.

In order to be able to drive the threaded rods, it is proposed that said threaded rod be mounted on the frame of the industrial truck so as to be able to rotate freely about its longitudinal axis and to be able to pivot relative to the frame, said threaded rod having at its frame-side end a screw head to which a tool can be attached in order to cause the threaded rod to rotate about its longitudinal axis. The screw head is for example a square or hexagonal screw head which can be actuated by a corresponding tool, for example a spanner, compressed air screwdriver and the like. Such tools are generally available both at the site of production of the industrial truck and on the customer's premises, so that the pivoting of the lifting structure does not require cranes or additional forklift trucks.

During the preparation for transportation of an industrial truck, the electrical and the hydraulic power supply to the industrial truck are generally switched off. The load part attached to the lifting structure, in particular the driver's cab and the load receiving fork, remain, in the operating position of the lifting structure owing to gravity, in a ready-to-operate position at their respectively lower abutment. The effect of gravity generally prevents the load part from moving upward out of this position. However, if the lifting structure is pivoted and in particular is mounted in its abutment position, which can be substantially horizontal, the load part can be displaced along the lifting structure, in particular owing to the inertia thereof, if the industrial truck is located on an accelerating or braking transportation vehicle. In order to counteract such undesired movement of the load part relative to the lifting structure during transportation, it is proposed that arresting means, which are used to secure against displacement a load part, which is displaceable along the lifting structure, in a position of the lifting structure that is pivoted out of the operating state, be provided in the region of the linkage of the tilting mechanism to the lifting structure. Preferably, the linkage of the nut to the lifting structure and the arresting means are in this case joined together in such a way that they can be jointly fastened to the lifting structure. This has the advantage that during the attachment of the tilting mechanism for the purposes of pivoting the lifting structure, the arresting of the loading part that is required during pivoting is, as it were, facilitated automatically.

The invention further relates to an industrial truck, in particular a commissioner, comprising a tilting mechanism according to the invention.

In the case of lifting structures of the known type, which are pivoted between the operating position and abutment position by means of forklift trucks, it has also been found that the load part attached to the lifting structure in the ready-to-operate position, in particular the load receiving fork in the abutment position of the lifting structure, protrudes upward from said lifting structure, so that transporting the industrial truck generally requires the load fork to be removed from its ready-to-operate position on the lifting structure and to be transported separately from the industrial truck. Obviously, this removal of the load receiving fork during the preparation for transportation also implies reattaching the load receiving fork during start-up of the industrial truck after delivery thereof; this is both time-consuming and leads to high costs as a result.

Therefore, a further aspect of the present invention proposes a method for transporting an industrial truck, wherein the lifting structure of the industrial truck to be transported is pivoted into a transportation position, which is inclined relative to the operating position, and fixed in this transportation position, load receiving means, in particular a load receiving fork, remaining attached to the lifting structure in a ready-to-operate position during transportation. This method uses the tilting mechanism according to the invention which allows the lifting structure to be fixed in any desired pivoting position between the operating position and the abutment position.

Preferably, in the proposed method, the transportation position, which corresponds to any desired pivoting position of the lifting structure, is selected in such a way that both the pivoted lifting structure and the pivoted load receiving means are arranged below a specific transportation height based on the substrate. In this case, the transportation height is determined by how much space is present in the vertical direction in a transportation vehicle or a container to be attached to a transportation vehicle.

Preferably, a highest point of the pivoted lifting structure is higher in the transportation position than a highest point of the pivoted load receiving means. Such a transportation position allows for example a plurality of industrial trucks which are provided for transportation and comprise pivoted lifting structures and load receiving means arranged thereon in the operating position to be positioned one after another on a transportation vehicle, the load receiving means of a rear industrial truck being movable below the upper region, pivoted backward, of a lifting structure of a front industrial truck, so that two industrial trucks can be accommodated one after the other in a compact manner.

A minimum possible transportation height can be achieved if a highest point of the pivoted lifting structure and a highest point of the pivoted load receiving means are at substantially the same transportation height in the transportation position. This state is attained in precisely one pivoting position in which a line imagined between the highest point of the pivoted lifting structure and the highest point of the pivoted load receiving means runs substantially parallel to the substrate.

The invention will be described hereinafter based on an exemplary and non-limiting embodiment and with reference to the appended drawings, in which.

Figure 1:
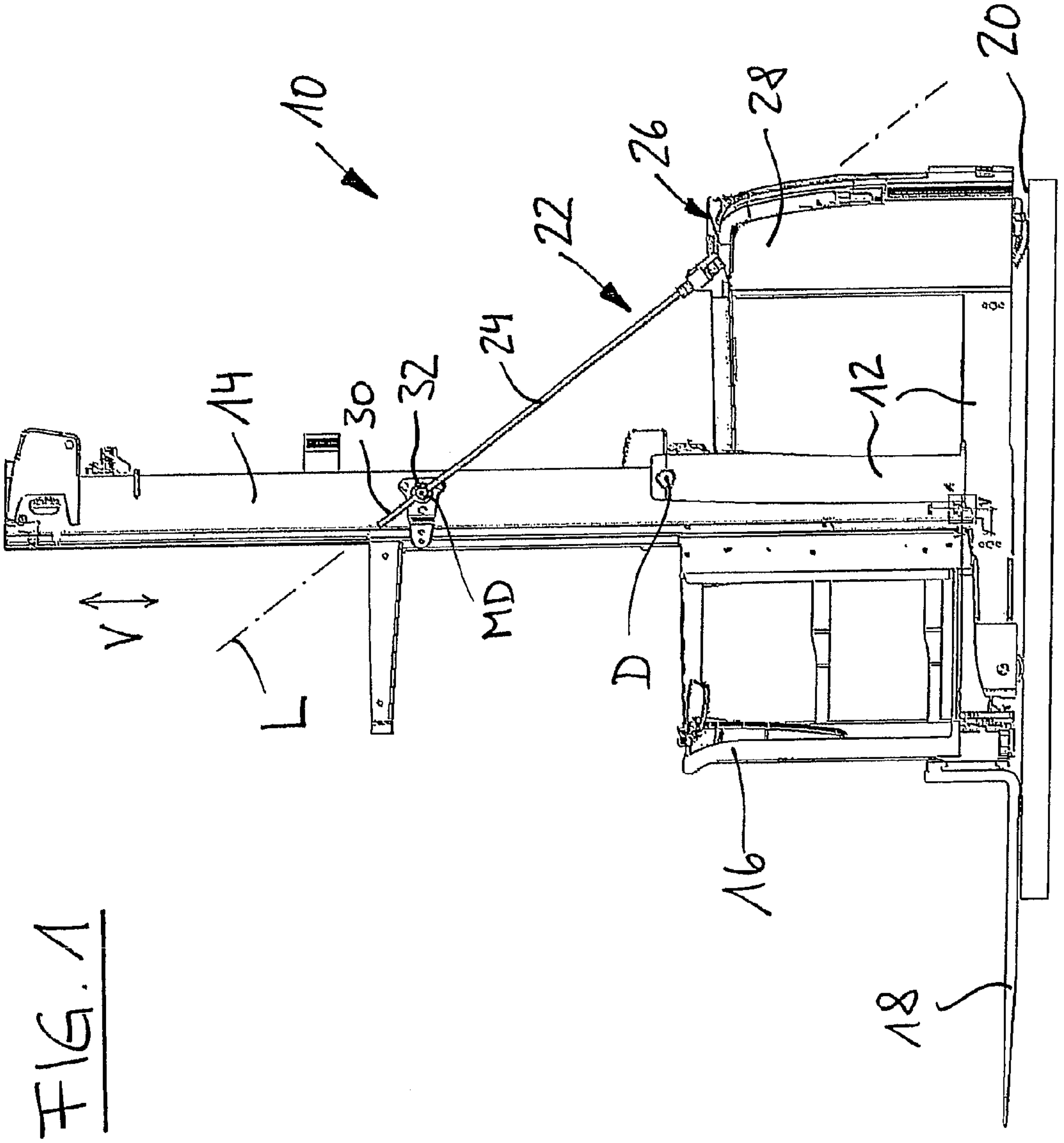
FIG. 1 is a lateral elevation of a commissioner with a lifting structure in the operating position.

FIG. 1 is a schematic lateral elevation of an industrial truck in the form of a commissioner 10. The commissioner 10 comprises a vehicle frame 12 on which a lifting structure 14 is mounted so as to be able to pivot about a hinge pin D. A driver's cab 16, which is displaceable along the telescopic lifting structure 14 in the vertical direction V, is attached to the lifting structure 14. A load receiving fork 18, on which pallets and the like can be received, is fastened to the driver's cab 16.

The commissioner 10 is illustrated in FIG. 1 in its operating position in which the lifting structure 14 extends upward substantially vertically with respect to the substrate 20. The load receiving fork 18 is arranged on the driver's cab 16 or on the lifting structure 14 in a ready-to-operate position, i.e. a position in which it is, during normal operation of the commissioner 10, attached to said operator and operative.

The commissioner 10 has on one side a tilting mechanism 22 for the lifting structure 14. This tilting mechanism 22 comprises a threaded rod 24 which is fastened in an upper region 26 of the vehicle frame 12 or a lining 28. In this case, the threaded rod 24 is mounted on the one hand so as to be able to pivot about a pivot axis S relative to the vehicle frame 12 and on the other hand so as to be able to rotate about its longitudinal axis L. The lifting mechanism-side end 30 of the threaded rod 24 is guided through a nut 32 which can rotate relative to the lifting structure 14 about a nut axis of rotation MD.

Figure 2:
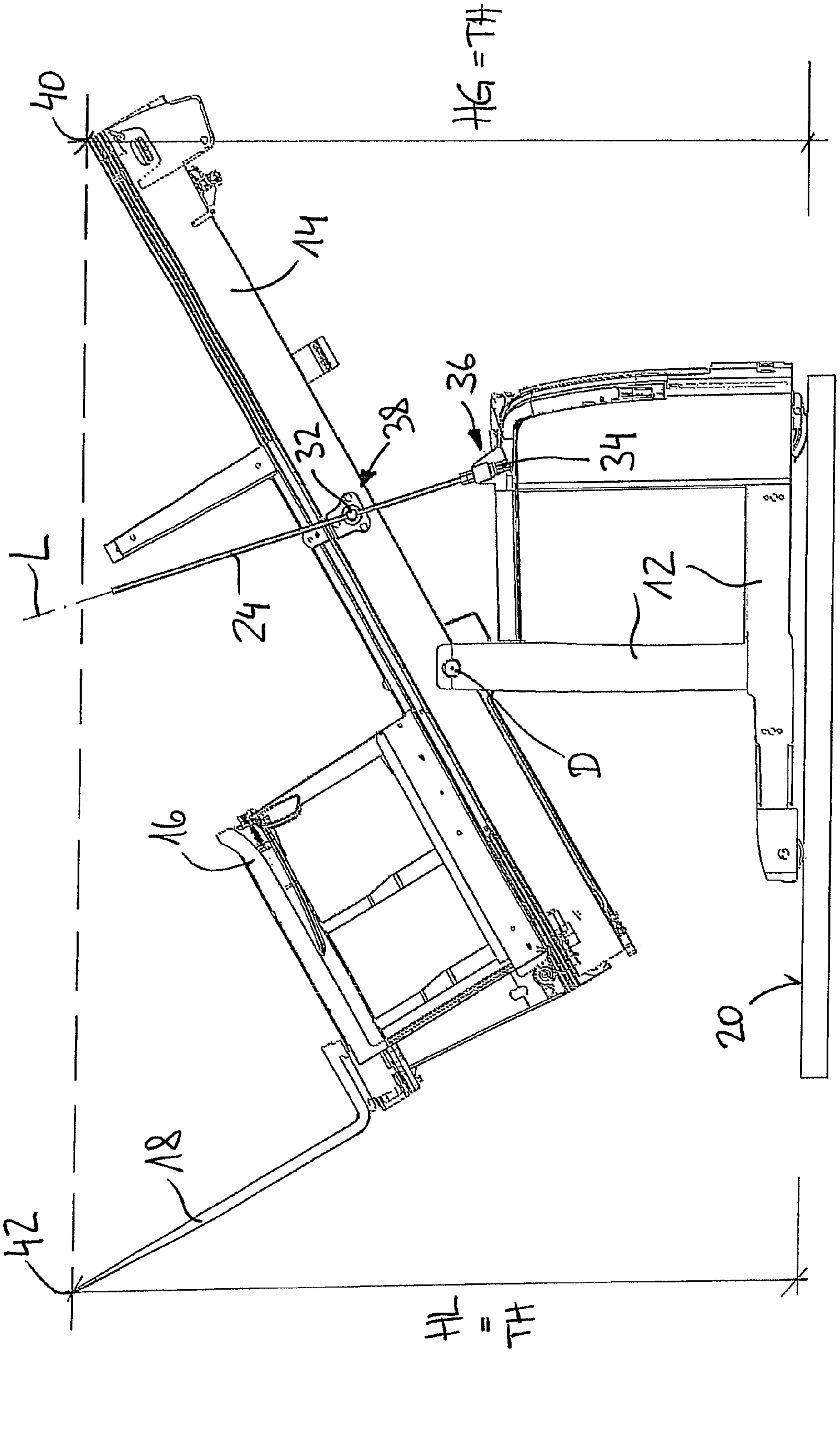
FIG. 2 is a lateral elevation of a commissioner with a pivoted lifting structure.

When the threaded rod 24 is rotated about its longitudinal axis L, the threaded engagement between the threaded rod 24 and the nut 32, which is mounted on the lifting structure 14, converts the rotational movement of the threaded rod into a linear movement of the nut 32 along the threaded rod 24, so that the lifting structure 14 is pivoted about the hinge pin D, as is illustrated in FIG. 2. In order to cause the threaded rod to rotate, it has at its frame-side end a hexagonal screw head 34 with which an appropriate tool, for example a spanner, compressed air screwdriver or the like, can be brought into engagement.

As may be seen from FIG. 2, the lifting structure 14 is held, as a result of the mounting in the region of the hinge pin D and the points 36, 38 of linkage to the frame 12 or to the lifting structure 14 of the tilting mechanism 22, securely in the illustrated arbitrary pivoting position which can also be a transportation position. The threaded engagement between the nut 32 and threaded rod 24 prevents the lifting structure 14 from carrying out any rocking movements in the pivoting positions. The pivoting position illustrated in FIG. 2 corresponds to a position in which a minimum transportation height TH is attained with the load receiving fork 18 attached to the lifting structure 14 in the operating position, as a highest point 40 of the lifting structure 14 and a highest point 42 of the pivoted load receiving fork 18 are located at substantially the same heights HG and HL respectively above the substrate 20. In such a transportation position, the heights TH, HG and HL are therefore substantially equal and the commissioner 10 can also be received, with the load receiving fork 18 attached thereto, in a transportation container or on a transportation vehicle.

Figure 3:
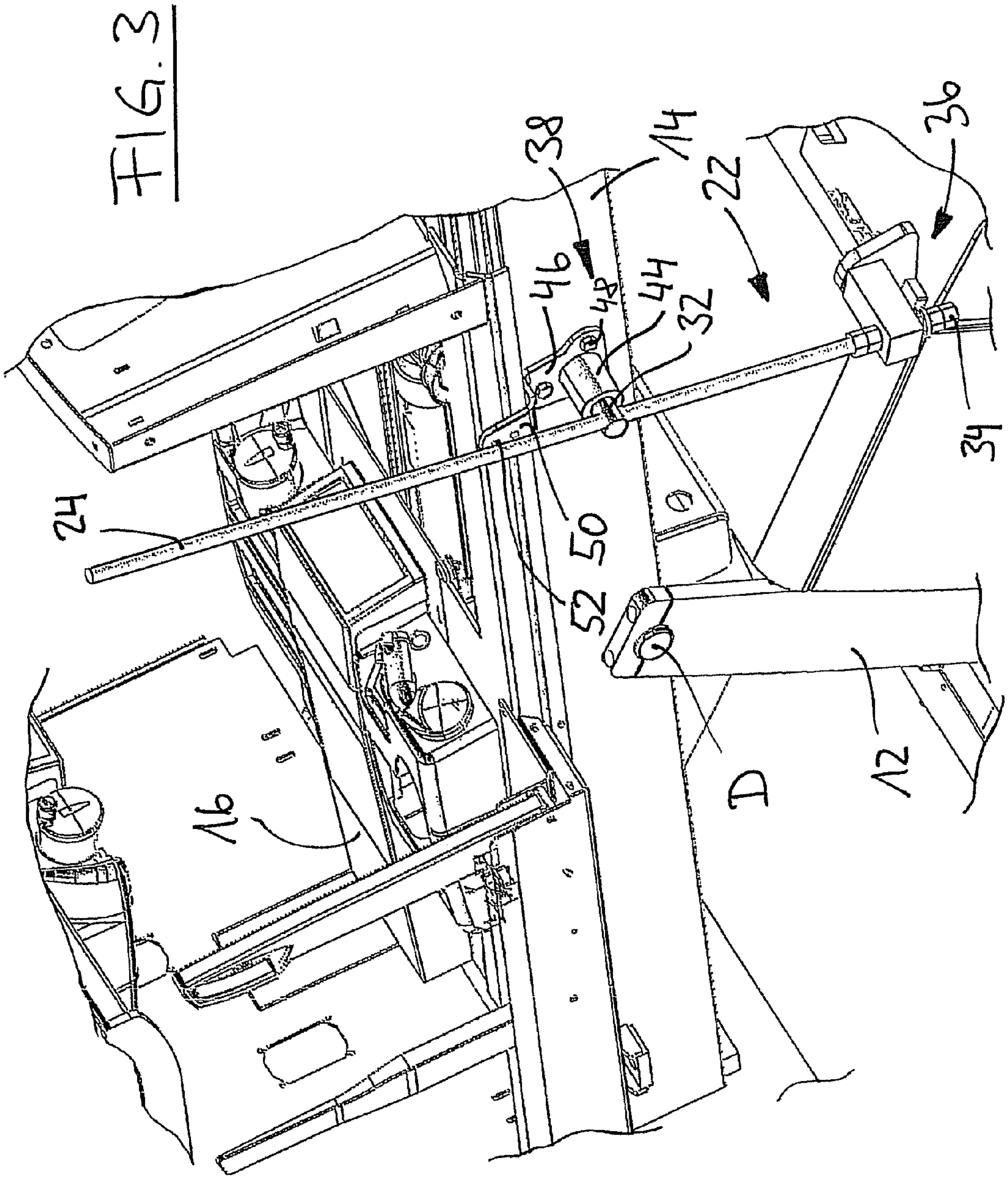
FIG. 3 is an enlarged perspective detailed view from obliquely above onto the lifting structure and the tilting mechanism.

FIG. 3 is a perspective view from obliquely above of the tilting mechanism 22 in the pivoted position of the lifting structure 14. This view reveals that the nut 32 is supported on the lifting structure 14 by means of a rotary bearing 44 which is arranged on a plate 46. The plate 46 is screwed to the lifting structure 14 by screws 48 and has a protruding tab 50 extending laterally to the driver's cab 16. This tab 50 is used to be able to arrest a movement of the driver's cab 16 when the lifting structure 14 is pivoted, in that for example the frame of the driver's cab 16 contains corresponding holes which are in alignment with the two holes 52 in the tab 50, and a screw/nut connection can be used to arrest or secure the driver's cab 16 relative to the lifting structure 14. Obviously, such securing or arresting for the driver's cab 16 during transportation can also be configured differently or be provided at a different location of the lifting structure. The key point in the present embodiment is that the linkage of the tilting mechanism 22 and the arresting for the driver's cab 16 are achieved by means of the same plate 46, so that the arresting of the driver's cab, which is beneficial for pivoting the lifting structure 14, is prepared or can be carried out at the same time as the attachment of the tilting mechanism 22 to the commissioner 10.

Figure 4:
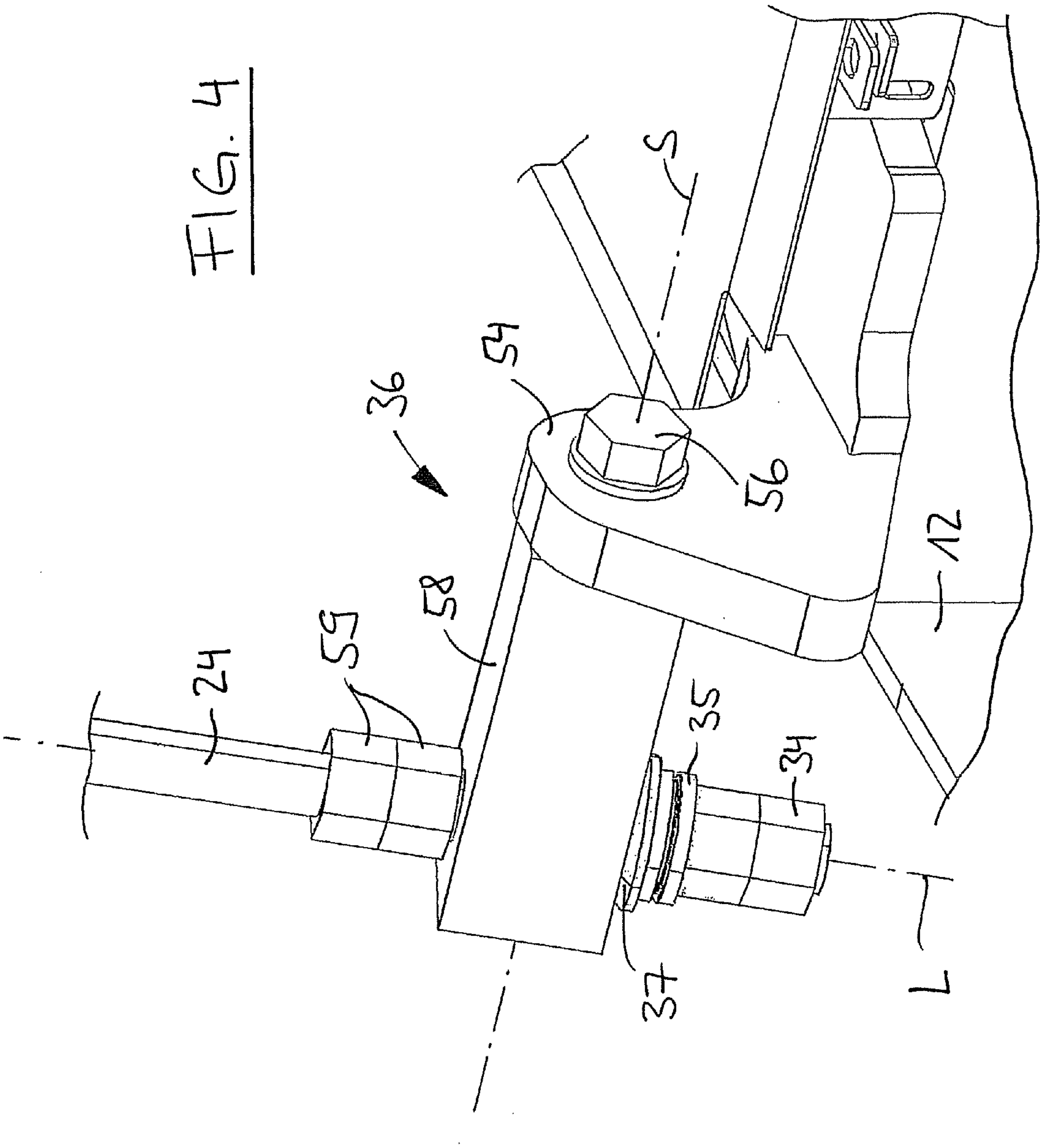
FIG. 4 is an enlarged perspective detailed view of the linkage of the tilting mechanism to the frame of the commissioner.

FIG. 4 is a perspective schematic detailed view of the linkage 36 of the tilting mechanism 22 to the frame of the commissioner 10. For the linkage of the tilting mechanism, a flange 54, through which is guided a screw bolt 56 which is in threaded engagement with a threaded rod receiving block 58, protrudes upward from the frame 12. The threaded rod receiving block 58 can pivot relative to the flange 54 about the pivot axis S. The longitudinal axis L of the threaded rod 24 extends orthogonally to this pivot axis S. The threaded rod 24 is guided through the threaded rod receiving block 58 and has at the lower end the screw head 34 which can rotate relative to the threaded rod receiving block 58 about the longitudinal axis L. The screw head 34 and the threaded rod 24 are in rotational engagement with each other, so that during rotation of the screw head 34 the threaded rod 24 is rotated about its longitudinal axis L. An (optional) axial bearing 35 for reducing the drive torque and a spherical disc 37 with a correspondingly embodied conical socket in the threaded rod receiving block 58 to compensate for any alignment errors or production tolerances, adjoin above the screw head.

Above the threaded receiving block 58, one or two nuts 59 adjoin the threaded rod 24. The purpose of these nuts is to arrest the threaded rod 24 so as to prevent rotation about the axis of rotation L. Furthermore, these nuts 59 prevent the lifting structure 14 from suddenly switching over if the centre of gravity shifts during the tilting process. During the tilting process, there is (as a function of the height and the weight of the lifting structure or the cab) a point from which the tensile force in the threaded spindle becomes zero or negative; without nuts 59, this would cause the lifting structure 14 to switch over unimpeded about the hinge pin D.

Figure 5:
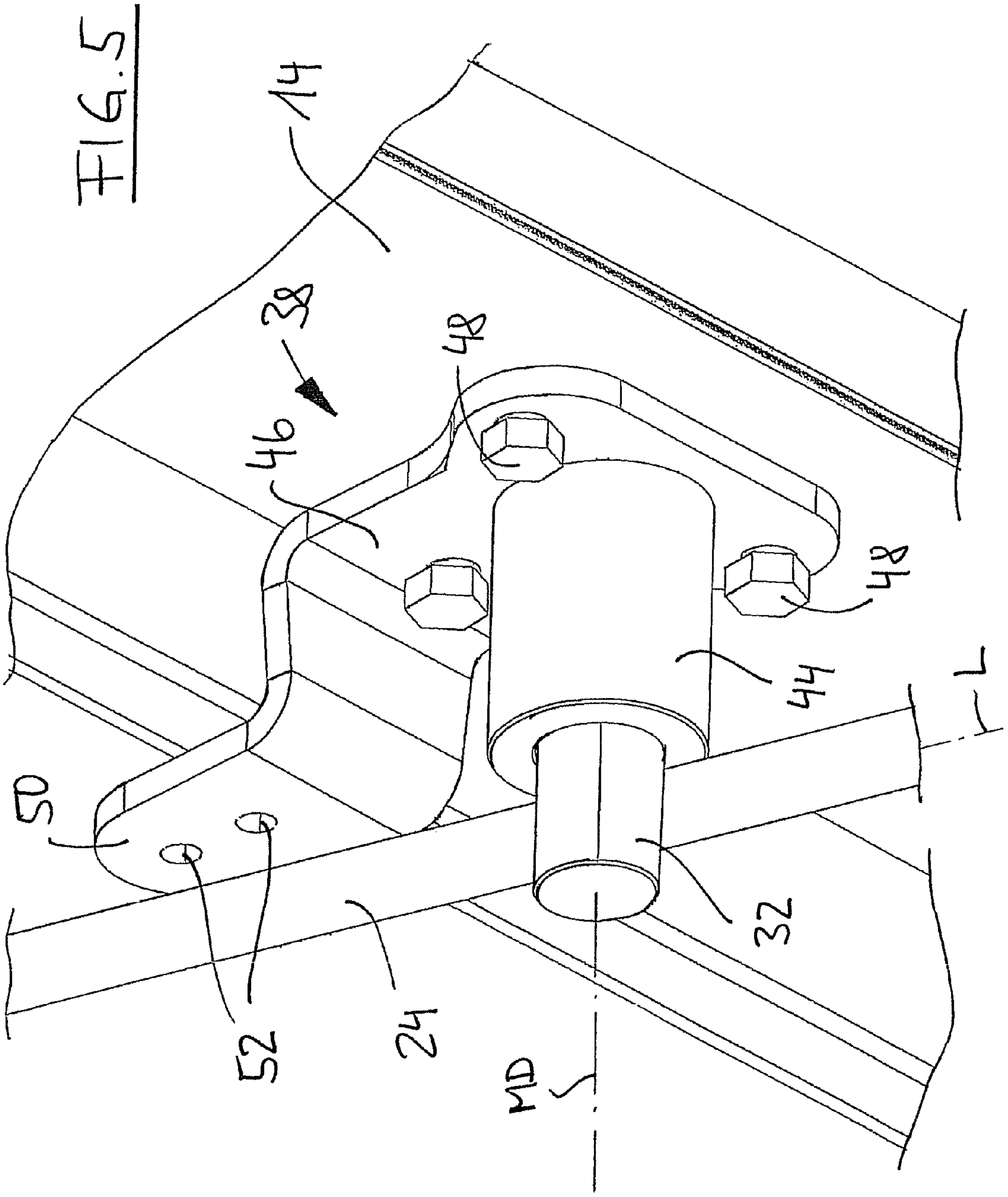
FIG. 5 is an enlarged perspective detailed view of the linkage of the tilting mechanism to the lifting structure.

FIG. 5 is an enlarged perspective detailed view of the linkage 38 of the tilting mechanism 22 to the lifting structure 14. As previously described with reference to FIG. 3, the threaded rod 24 runs through the nut 32 which is rotatably mounted with respect to the lifting structure 14. Said nut is fastened to the lifting structure 14 by means of a plate 46. As stated hereinbefore, the plate 46 has an S-shaped tab 50 which serves to arrest the driver's cab 16.

Figure 6:
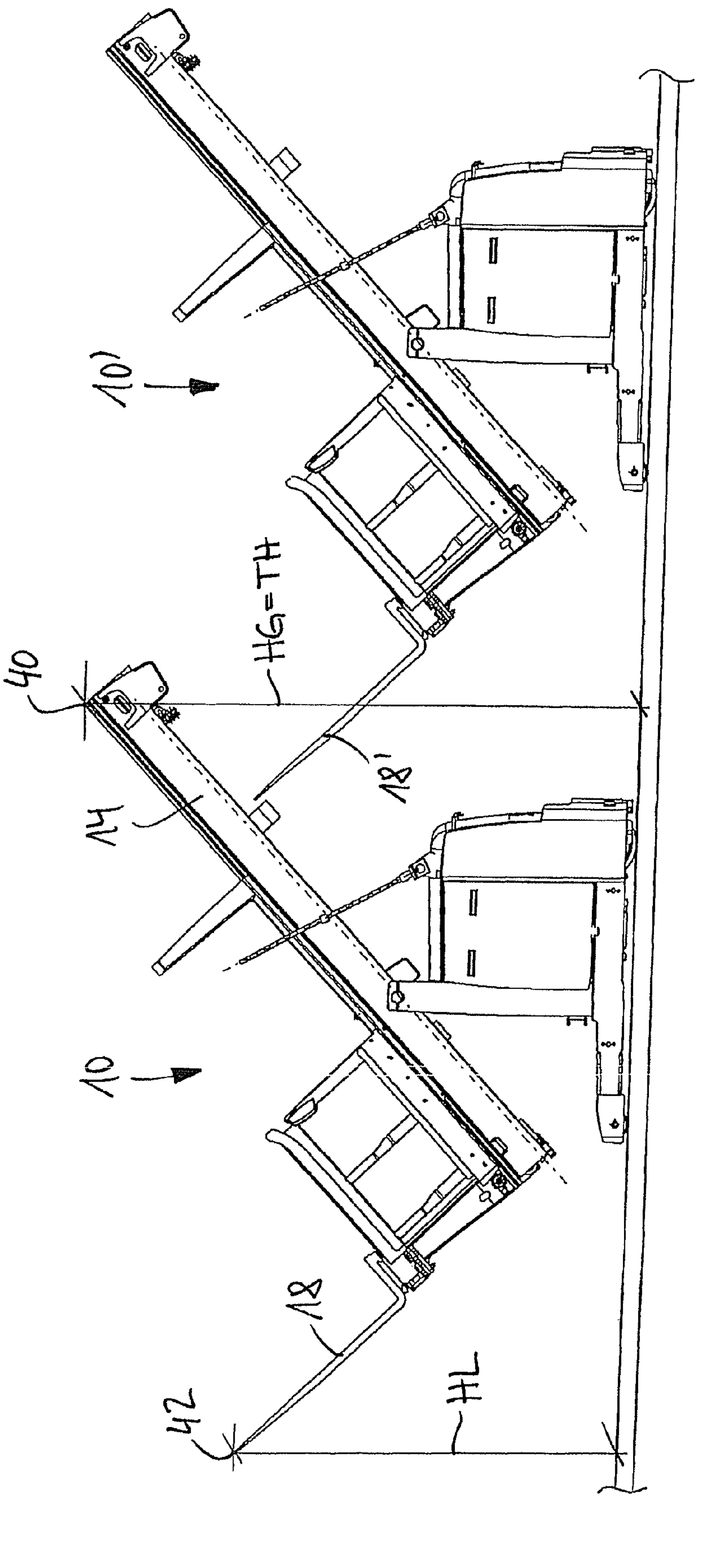
FIG. 6 shows by way of example the arrangement of two commissioners with lifting structures pivoted into the transportation position and with load receiving means in the ready-to-operate position.

FIG. 6 shows a further possible transportation position of the lifting structure 14. Such pivoting of the lifting structure 14 with the load receiving fork 18 remaining on the commissioner 10 in the ready-to-operate position allows two or more commissioners 10 to be arranged one after the other in a compact manner, the transportation height TH required for this purpose being determined by the highest point 40 of the pivoted lifting structure 14. Compared to the transportation position according to FIG. 2, the highest point 40 of the lifting structure 14 is somewhat higher than the highest point 42 of the pivoted load receiving fork 18 (HG>HL), thus allowing a rear commissioner 10' to be placed with its load receiving fork 18' below a rear region of the pivoted lifting structure 14 of a front commissioner 10. Obviously, if allowance is made for the corresponding time required, the load receiving fork 18 for the transportation of the lifting structure 14 or of the driver's cab 16 can also be detached, thus allowing an even more compact arrangement of a plurality of commissioners, one after another, with pivoted lifting structures 14.

The proposed tilting mechanism thus offers an optimum basis to allow optimum pivoting positions of the lifting structure 14 for respective transportation situations, thus allowing the space required for the industrial truck(s) to be transported to be minimized. Such minimizing of the space required can advantageously be achieved by the proposed tilting mechanism which allows any desired pivoting or transportation positions. Furthermore, the proposed tilting mechanism allows the time required for preparing the transportation and the subsequent start-up of the industrial truck to be significantly reduced, so that cost savings result therefrom.

Figure 7:
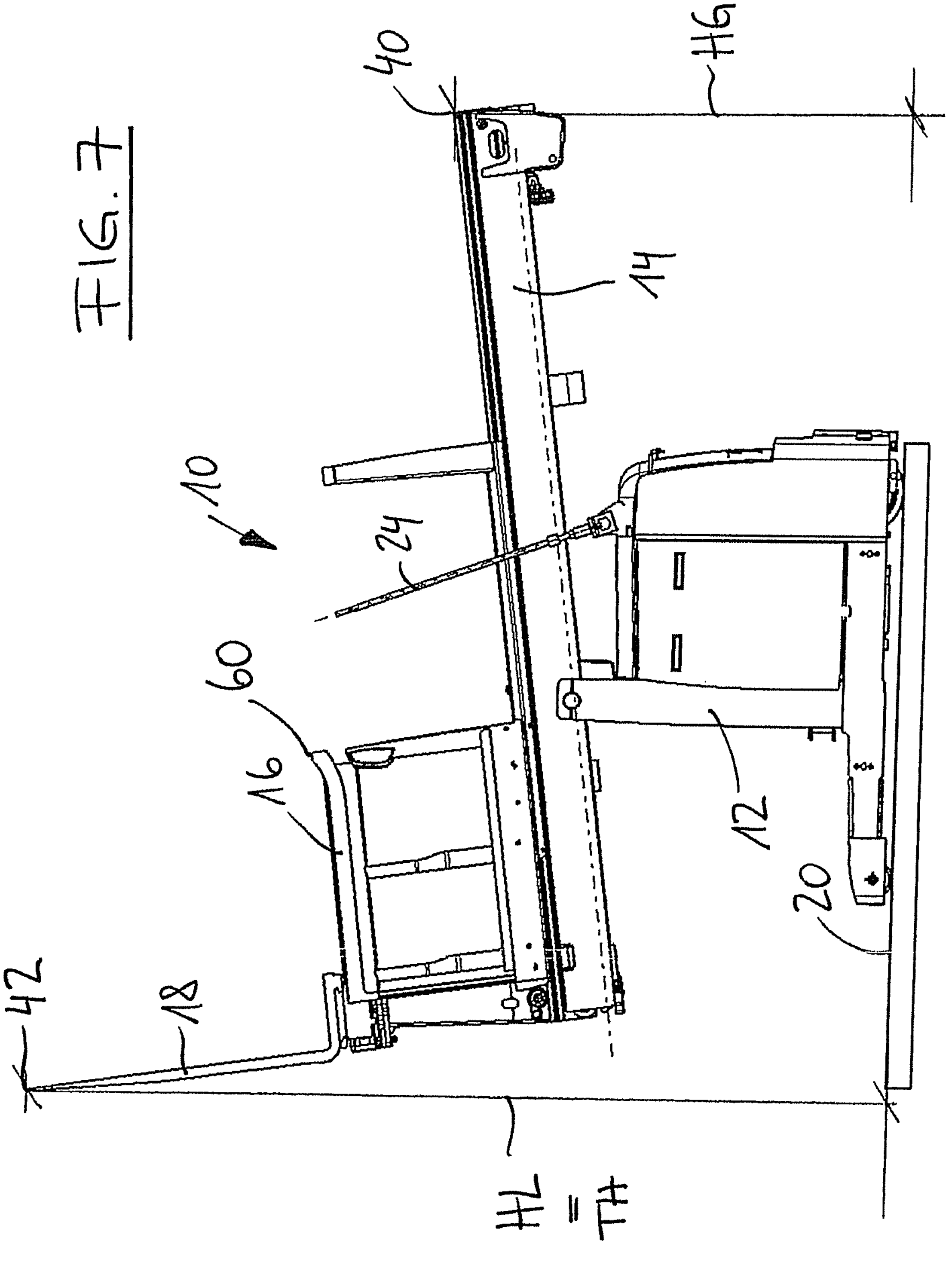
FIG. 7 shows the lifting structure in a substantially horizontal abutment position.

FIG. 7 shows the commissioner 10 with the lifting structure 14 in the abutment position in which the nut 32 rests against the frame-side end of the threaded rod 24. In this abutment position, the height HL of the highest point 42 of the load receiving fork 18 is greater than the height HG of the highest point 40 of the lifting structure 14 and thus defines the transportation height TH. In so far as the load receiving fork 18 is, in a transportation position of this type, not attached to the lifting structure 14, the required transportation height is determined by the highest point 60 of the driver's cab 16.

The invention claimed is:

1. A tilting mechanism for a lifting structure of an industrial truck having a frame and a load receiving fork, the lifting structure being mounted so as to be able to pivot about a hinge pin between an at least approximately vertical operating position and a position, inclined with respect to the vertical, of abutment against the frame of the industrial truck, the tilting mechanism comprising:

a first linkage to the lifting structures;

a second linkage to the frame of the industrial truck; and a threaded rod extending between said first and second linkages, wherein said threaded rod is in threaded engagement with said first linkage such that rotation of said threaded rod causes first linkage to move along the threaded rod and the lifting structure to pivot from said operating position to said position inclined with respect to the vertical.

2. The tilting mechanism of claim 1, wherein said first linkage is arranged in the operating position above the hinge pin of the lifting structure.

3. The tilting mechanism of claim 2, wherein when the lifting structure is in the operating position, the distance between the hinge pin and said first linkage to the lifting structure corresponds substantially to the distance between the hinge pin and said second linkage to the frame.

4. The tilting mechanism of claim 1, wherein said second linkage is provided on an upper portion of the frame of the industrial truck.

5. The tilting mechanism of claim 1, wherein said tilting mechanism can be detached when the lifting structure is in the operating position.

6. The tilting mechanism of claim 1, wherein said first linkage to the lifting structure comprises a nut, which can rotate relative to the lifting structure about an axis orthogonal to the threaded rod and with which the threaded rod is in threaded engagement.

7. The tilting mechanism of claim 6, wherein said nut is fastened to the lifting structure by a screw bolt so as to be able to rotate about said axis.

8. The tilting mechanism of claim 6, wherein a linkage of the nut and arresting means are joined together, such that they can be jointly fastened to the lifting structure.

9. The tilting mechanism of claim 1, wherein said threaded rod is mounted on the frame of the industrial truck so as to be able to rotate freely about its longitudinal axis and to be able to pivot relative to the frame.

10. The titling mechanism of claim 9, wherein said threaded rod has at the frame-side end a screw head to which a tool can be attached in order to cause the threaded rod to rotate about its longitudinal axis.

11. The tilting mechanism of claim 1, wherein arresting means, which are used to secure against displacement a load part, which is displaceable along the lifting structure, in a position of the lifting structure that is pivoted out of the operating state, are provided in the region of said first linkage to the lifting structure.

12. The tilting mechanism of claim 1, wherein said industrial truck is a commissioner.

13. A method for transporting an industrial truck, wherein said industrial truck includes a tilting mechanism for a lifting structure of said industrial truck, the lifting structure being mounted so as to be able to pivot about a hinge pin between an at least approximately vertical operating position and a position, inclined with respect to the vertical, of abutment against a frame of said industrial truck, the tilting mechanism being linked to the lifting structure by a first linkage and to the frame by a second linkage and being embodied in such a way that the lifting structure-can be fixed in any desired pivoting positions between the operating position and the abutment position, wherein the tilting mechanism comprises a threaded rod extending between said first and second linkages and in threaded engagement with said first linkage, comprising the steps of:

rotating said threaded rod, wherein said rotating causes the first linkage to move along the threaded rod and pivot the lifting structure into a transportation position, which is inclined relative to the operating position; and transporting said industrial truck in said fixed transportation position, wherein said industrial truck further includes a load receiving fork that remains attached to the lifting structure in a ready-to-operate position during transportation.

14. The method of claim 13, wherein said transportation position is selected in such a way that both the pivoted lifting structure and the load receiving fork are arranged below a specific transportation height relative to a substrate.

15. The method of claim 14, wherein a highest point of the pivoted lifting structure is higher in the transportation position than a highest point of said load receiving fork.

16. The method of claim 14, wherein a highest point of the pivoted lifting structure and a highest point of said load receiving fork are at substantially the same transportation height.

17. An industrial truck comprising:

a frame;

a lifting structure configured to pivot about a hinge between a first position and second position and comprising a load receiving fork;

a first linkage to said lifting structure;

a second linkage to said frame; and a threaded rod extending between said first and second linkages, wherein said threaded rod is in threaded engagement with said first linkage such that rotation of said threaded rod causes the lifting structure to pivot from said first position to said second position as said first linkage moves along said threaded rod.

* * * * *